United States Patent [19]

Smith

[11] E Re. 31,380

[45] Reissued Sep. 13, 1983

[54] RAYON FIBERS CONTAINING STARCH

[75] Inventor: Frederick R. Smith, Toms Brook, Va.

[73] Assignee: Avtex Fibers Inc., Valley Forge, Pa.

[21] Appl. No.: 189,870

[22] Filed: Sep. 23, 1980

Related U.S. Patent Documents

Reissue of:

[64] Patent No.: 4,144,079
Issued: Mar. 13, 1979
Appl. No.: 811,793
Filed: Jun. 30, 1977

U.S. Applications:

[63] Continuation-in-part of Ser. No. 696,451, Jun. 15, 1976, abandoned, and a continuation-in-part of Ser. No. 629,952, Nov. 7, 1975, abandoned.

[51] Int. Cl.[3] ..... C08L 1/24; D01F 2/08

[52] U.S. Cl. ..... 106/164; 106/168; 106/197 C; 264/186; 264/188; 264/191; 524/36; 524/52

[58] Field of Search ..... 264/188, 186, 191; 106/165, 197 C, 168, 164, 213, 210, 214; 536/105; 260/17.4 CL, 9, 13; 524/36, 52

[56] References Cited

U.S. PATENT DOCUMENTS

| | | | |
|---|---|---|---|
| 2,291,041 | 7/1942 | Kauffmann et al. | 106/213 |
| 2,307,684 | 1/1943 | Kauffman | 106/213 |
| 2,914,414 | 11/1959 | Novak et al. | 106/165 |
| 2,931,694 | 4/1960 | Wirth et al. | 8/21 |
| 3,066,032 | 11/1962 | Fukushima | 264/191 |
| 3,156,574 | 11/1964 | Gomm et al. | 106/165 |
| 3,163,550 | 12/1964 | Webb et al. | 106/214 |
| 3,187,747 | 6/1965 | Burgeni et al. | 128/156 |
| 3,336,144 | 8/1967 | Bridgeford et al. | 106/164 |
| 3,359,224 | 12/1967 | Faessinger et al. | 260/17.4 |
| 3,419,652 | 12/1968 | Kubota et al. | 264/168 |
| 3,497,584 | 2/1970 | Bridgeford et al. | 264/188 |
| 3,539,366 | 11/1970 | Ewing | 536/105 |
| 3,796,629 | 3/1974 | McMaster | 162/157 C |
| 3,833,022 | 9/1974 | Turbak et al. | 106/168 |
| 3,844,287 | 10/1974 | Smith | 260/17.4 CL |
| 3,847,636 | 11/1974 | Smith | 106/168 |
| 3,847,636 | 11/1974 | Smith | 106/197 C |
| 3,852,224 | 12/1974 | Bridgeford et al. | 106/164 |
| 3,872,196 | 3/1975 | Bridgeford | 264/188 |
| 3,884,908 | 5/1975 | Burke et al. | 106/164 |
| 3,919,385 | 11/1975 | Smith | 264/188 |
| 4,026,718 | 5/1977 | Cornelle et al. | 164/188 |
| 4,121,012 | 10/1978 | Bockno | 264/168 |
| 4,136,697 | 1/1979 | Smith | 128/285 |
| 4,263,244 | 4/1981 | Allen et al. | 264/168 |

FOREIGN PATENT DOCUMENTS

| | | | |
|---|---|---|---|
| 835420 | 1/1976 | Belgium . | |
| 1082866 | 8/1980 | Canada . | |
| 41-14609 | 8/1966 | Japan | 264/188 |
| 47-23687 | 7/1972 | Japan | 264/188 |
| 1517398 | 7/1978 | United Kingdom . | |

OTHER PUBLICATIONS

"Chemistry & Industry of Starch" by Kerr Academic Press. 2nd Ed. 1950, pp. 313, 314, 328 PTO Lib.

"Encyclopedia of Polymer Science & Tech." vol. 12, pp. 800, 804, 805 and 814.

Hack's Chemical Dictionary, 4th Ed. McGraw Hill pp. 43, 634 and 635.

"The Skin Effect in Crimped Rayon" Sisson Med. Text Res. J. pp. 152–157, Mar., 1953.

*Primary Examiner*—Jay H. Woo

*Attorney, Agent, or Firm*—Arthur R. Eglington

[57] ABSTRACT

Rayon fibers made by spinning a viscose containing dissolved starch. Starch grains may be slurried in water, then made alkaline with NaOH to form a solution and then added to viscose.

19 Claims, 1 Drawing Figure

RAYON FIBERS CONTAINING STARCH

Figure 1:
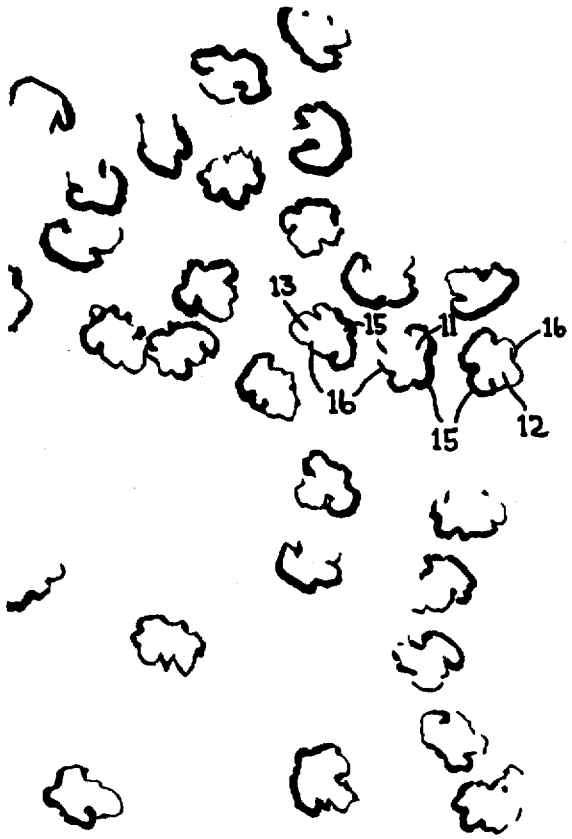

Matter enclosed in heavy brackets [ ] appears in the original patent but forms no part of this reissue specification; matter printed in italics indicates the additions made by reissue.

CROSS REFERENCE

This application is a continuation-in-part of my U.S. Pat. application: Ser. No. 629,952, filed Nov. 7, 1975 now abandoned, and a continuation-in-part of my U.S. Pat. application: Ser. No. 696,451, filed June 15, 1976, now abandoned.

This invention relates to rayon fibers containing proportions of starch, such as up to about 100% of starch b.o.c. ("b.o.c." is used herein as an abbreviation for: based on the weight of the cellulose). Preferably, the proportion of starch is below about 60% b.o.c., such as about 5 to 25% b.o.c.

One aspect of the invention relates to the technique for incorporating the starch into the viscose used to make the rayon. It has been discovered that this can be readily and uniformly accomplished by incorporating the starch grains into aqueous NaOH solution having an NaOH content higher than about 2% and less than about 4½%, based on the total weight of water and NaOH. Generally, there is formed a translucent solution of the starch. In such a solution, the proportion of starch may be, for instance, in the range of about 6 to 20% (based on the total weight of the solution). It is also found that such a solution (or solutions containing greater proportions of NaOH) may be formed most conveniently by first slurrying the starch grains in aqueous medium, such as ordinary tap water or deionized water, which has substantially no effect on the grains except to keep them dispersed, and then mixing the slurry with aqueous alkali.

By using appropriate proportions, generally within the ranges indicated above, it is found that one forms a viscous, but ungelatinized, solution having a ball fall viscosity usually less than about 200 seconds, preferably less than 150 seconds, e.g., in the range of about 30 to 100 seconds. This is very suitable for incorporation into a viscose solution, e.g., by injection into the viscose solution just before spinning, or by addition to the "viscose mixer" or other zone in which the viscose is "aged" before spinning.

As is well known, in the art, filtration of the viscose (by conventional techniques) before spinning is an important step in order to insure continuity in spinning. See for instance (1) Papper Och Tra, Issue #5, 1962, p. 295, Sihtola, Nizovsky & Kaila, The Evaluation of Viscose Pulp by Using a Small Scale Method for Preparation of Viscose; (2) TAPPI, March 1969, Vol. 52, #3, p. 501, Sihtola et al., Preparation of High Quality Viscose from Low-Cellulose Pulp by a Modified Steeping-Ageing Procedure; and (3) Das Papier, 16, No. 3, p. 85–94, 1962, A Miniature Laboratory Viscose (Plant) for Testing Chemical Pulps, Treiber, E.

To determine the optimum concentration of alkali for forming the starch solutions, the following experiment (hereinafter termed the "microscope method") was carried out using a microscope fitted with polarizer and analyzer: (a) place grains of starch (between 50 and 100 grains), as received, on a plain glass microscope slide; (b) cover the starch with a cover glass; (c) place the slide on the microscope stage; (d) focus the microscope and adjust the polarizing means to show the Maltese Cross characteristic of natural starch grains; (e) by means of a medicine dropper, and while observing the grains through the microscope, introduce aqueous alkali solution of different NaOH concentrations (1½, 2, 2½, 3, 3½, 4, 4½, 5, 5½, 6%) to the space around the starch grains; (f) record observations as to swelling, disappearance of the Maltese Cross and the disappearance of grain boundaries. Concentrations of NaOH in water up to six percent were used in tests on corn starch.

With grains of ordinary corn starch, it was found that the Maltese Cross disappeared in all concentrations of alkali used; the rate of swelling and of the disappearance of the Maltese Cross was very rapid, almost identical with the rate of wetting of the grains; even though the grains swelled, and the Maltese Cross disappeared, the outline of swollen grains was discernible at or below two percent NaOH and at or above 4½% NaOH; but in the range of from 2½% to 4%, no grain boundaries were visible.

The invention yields starch solutions of very good filterability, as well as starch-viscose mixtures of good filterability. Filterability may be measured, for instance, by pumping the material at a constant volumetric rate through a conventional standard filter cloth and (after an initial lineout period of, say, one hour) measuring the pressures upstream of the filter cloth and determining the rate of increase of pressure.

By using the procedure in which the starch granules are slurried in the aqueous medium, before an alkali of starch-solubilizing concentration is mixed with the starch, one insures against formation of gels or lumps in the starch solution. The starch solutions produced in this way may contain air bubbles; when the bubbles are removed (as by vacuum deaeration), the solution is translucent.

The aqueous medium in which the granules are slurried may be ordinary tap water, or water containing small amounts of alkali (e.g., 0.01 N NaOH solution), or acid, or other ingredient. The preferred type of slurrying medium is one which has substantially no effect on the integrity of the grains, and in which the grains have substantially no tendency to clump together (which clumping tendency could be due, for instance, to induced surface tackiness of the grains).

The aqueous slurrying medium may contain ingredients which reduce the molecular weight of one or both of the polymeric components (amylose and amylopectin) of the starch. For instance, one may include hydrogen peroxide (which may be present in very small amounts, such as 0.01 to 0.05% $H_2O_2$ based on the weight of water). The hydrogen peroxide is relatively inactive in the slurry but when the mixture is made alkaline, it acts quite rapidly to decrease the molecular weight of the starch polymer. It has been found that this makes it possible to prepare starch solutions which have higher concentrations of starch, e.g., above 14% such as about 18% or more, but are still readily pumpable and otherwise processable, having ball fall viscosities of below 200 (which is about 225 poises at 18° C. and preferably below 150 (about 170 poises), e.g., in the range of about 30–100 (about 35–110 poises). The degree to which the molecular weight reduction (e.g., chain scission) is carried out may be readily controlled by the concentration of chainbreaking agent. The reduction of molecular weight can be effected in other ways such as by storing the alkaline solution under conditions in which atmospheric oxygen acts on it, (or by including NaOCl instead of $H_2O_2$ in the slurry.) The use of the higher starch concentrations makes for economy of operation in that the amount of water in the viscose-starch blend is reduced and the polymer:NaOH ratio is also more economical. Fibers of very good properties are obtained with the "degraded" starch solutions.

The formation of the starch solutions used herein (with or without molecular weight reduction) may be carried out readily without heating (e.g., at temperature well below 35° C., such as 30° C., 25° C., 20° C., or 15° C.) and therefore without the need for cooling before mixing with the viscose. In the starch solutions the number of moles of NaOH per anhydroglucose unit of the starch is at least about 0.5, such as about 1 (e.g. 0.8, 1.0 or 1.2).

Another aspect of this invention relates to the incorporation of starch into viscose which is spun under conditions effecting a substantial orientation of the cellulose molecules, such as conditions in which the fiber, while in a plastic state is stretched by fifty percent (50%) or more. It is found that the presence of the starch in such oriented fibers does result in some lessening of tensile properties (e.g., breaking energy), but that the fibers still have very good tensile properties, such as conditioned tenacity well above 2 grams per denier, such as 2.5 grams per denier or more (e.g., over 5 g.p.d. as illustrated below). The stretching is preferably effected in a hot aqueous stretch bath preferably containing well below 5% $H_2SO_4$(e.g., about 3% $H_2SO_4$), at a temperature well above 70° C., such as 90°-100° C., after the fibers have been initially coagulated into a plastic condition. The initial coagulation may be effected, for example, by spinning into an acidic aqueous spin bath containing at least about 0.5% $ZnSO_4$, such as bath containing about 6-13% $H_2SO_4$, about 12-25% $Na_2SO_4$ and above about 0.5% $ZnSO_4$ (e.g., 0.6%, 1%, 1.5%, 4% or 5% $ZnSO_4$) dissolved therein.

Another aspect of this invention relates to the formation of "chemically crimped" rayon fibers containing minor proportions of starch. In the production of such fibers, a viscose solution containing the starch may be spun into filament form, in the manner conventionally used for making chemically crimped rayon fiber, by extruding it through fine orifices into a sulfuric acid spin bath, and then stretching the filaments, while still plastic, under such conditions as to form coagulated regenerated filaments having a skin and a partly exposed core, and then cutting the stretched filaments into staple fibers and allowing them to relax (e.g., in a hot water bath) and thereby to take on a crimped configuration. It is found that one obtains starch-containing fibers having very good levels of crimp and useful characteristics. Examples of techniques of this type, and illustrations of the skin-core effect are found in Sisson and Morehead, Textile Research Journal, March 1953, pages 153-157 and U.S. Pat. Nos. 2,517,694 and 3,419,652.

FIG. 1 shows typical cross-sections of such crimped starch-containing fibers (20% starch, b.o.c.) which have been stained to show the skin and core in conventional fashion. For instance in the fibers marked 11, 12 and 13, the thick skin is indicated at 15 and the exposed portion of the core at 16, the skin being "broken" so that a portion of the core is exposed.

It is found that the process of this invention gives outstanding "yields" of fiber. For instance, in one extended run the weight of fiber (calculated on a dry basis) obtained was over 99% of the total weight of cellulose, starch and $TiO_2$ used to make the spinning solution, and the analytically determined starch content (b.o.c.) of the fibers was substantially the same as the proportion of starch included in the spinning solution.

The starch-containing rayon fibers produced in accordance with this invention are suitable for a great many uses. Fabrics made entirely therefrom have been found to be capable of being washed repeatedly (e.g., 50 washes with household detergent in an automatic washing machine, using standard laundering conditions). The effects of such washing have been found not to differ significantly from those with ordinary rayon. Under the light microscope, the starch-containing fibers appear to be of homogeneous chemical nature; e.g., on iodine staining (indicating the presence of starch), the staining is found to be uniform throughout the cross-section of the fiber. With ordinary rayon dyes (e.g., vat dyes, such as mayvat blue BFC; reactive dyes, such as procion yellow MX4G; and direct dyes, such as Solantine Red 8BLN), the starch-containing fibers dye well, usually more intensely than ordinary rayon and with more substantivity, thus requiring less dyestuff to attain a given desired change. Moisture regain (measured at 75° F. and fifty-eight percent R.H.) is, for fibers containing about ten percent starch (b.o.c.), in the range of about eleven to twelve percent (ordinary rayon is usually within the same range).

The fibers are resistant to removal of the starch; for instance when a mass of the fibers (of 10% starch content b.o.c.) is soaked for about ½ hour at room temperature in about thirty times its weight of a one N aqueous solution of NaOH, the fibers swell to a considerably greater extent than ordinary rayon fibers; but when the soak liquid is then poured off, neutralized with HCl or $H_2SO_4$ and tested for the presence of starch by the conventional iodine test, it shows only a very faint color indicating that the starch content of the soak liquid is less than 50 p.p.m.

The fibers behave well in processing, such as in high-speed carding, to form a card web suitable for bonding into a non-woven fabric (e.g., by impregnation with a latex of polymeric bonding agent). The fibers may be used to form structures in which they are the sole fibers or they may be blended with other fibers, such as ordinary rayon, polyethylene terephthalate or other polyesters, nylon-6, nylon-66 or other nylons, cellulose acetate, cellulose triacetate, acrylonitrile homo- or copolymers.

In textile fabrics the fibers may be blended to form yarns or yarns of different fibers may be present in the fabric. The fibers may be in the form of staple fibers or continuous filaments. Fabrics made from the starch-containing fibers may be used for such purposes as cover stock for diapers and pads; tampons; industrial wipes; food filters; felts; surgical sponges; prep balls and swabs (medical); and spun lace-like nonwovens.

The textile fabrics may be woven or knitted and may be used in home furnishings (such as draperies and upholstery); in apparel (such as adult and children's wear, e.g., shirting, blouses, underwear, and interlinings, like neckwear, lapels, etc.); for domestic uses (such as sheeting, linens, and towels), or for industrial uses (e.g., in hose reinforcements) or other purposes (e.g., tarpaulins, tentage materials, and wall coverings).

The following Examples illustrate this invention further. In this application all proportions are by weight unless otherwise indicated.

EXAMPLE I

Alkaline starch solution was prepared by mixing a slurry of corn starch grains in water with an 18% NaOH aqueous solution at about 20° to 25° C., to give a translucent viscous solution comprising 13% starch and 4% NaOH.

In a conventional viscose mixer, viscose containing 9.2% cellulose, 6.2% NaOH, 32% $CS_2$ b.o.c., and about ½% $TiO_2$ b.o.c., was prepared by dissolving xanthated alkali cellulose in aqueous NaOH and mixing for about 2 hours. A quantity of the alkaline starch solution described above was then added to the viscose in amount such that the resulting viscose-starch blend contained 10% starch based on the weight of the cellulose.

Mixing was continued for one hour and the solution was aged for about 24 hours at about 19° C., (including a period of about 12 hours for vacuum deaeration). The solution was filtered both before deaeration and after, and directly pumped (e.g., within a half hour) through the spinnerette. At the spinnerette, the ball fall viscosity of the viscose-starch blend was about 90 and its salt test value was about 8. The solution was spun (through 12,000 circular spinnerette holes 0.0025 inch in diameter) into an aqueous spin bath containing seven to eight percent $H_2SO_4$, about 1.5% $ZnSO_4$, and about twenty-one percent $Na_2SO_4$ at 55° C.

The tow formed in the spin bath was passed around a driven roll and then pulled (by a second driven roll) through a stretch bath containing 3% $H_2SO_4$ aqueous solution at about 90° C. The stretch bath is continuously replenished by spin bath carried into it by the tow, and by additions of water from time to time. The exit speed (i.e., the speed at the surface of the second driven roll) was 60 meters/minute, and the speed ratio of the first and second driven rolls was such that the tow was stretched about 60 to 75% in the stretch bath.

The length of travel of the tow in the spin bath was about ½ meter and in the stretch bath about 2 meters. After leaving the driven roll, the tow dropped into a cutter and the resulting cut fibers dropped into flowing hot water (about 85° to 90° C.) where relaxation (and crimping) occurred. The fibers were taken up as a blanket, washed with hot water and desulfurized (with a conventional solution of sodium polysulfide), rewashed, a conventional staple finish solution, made from "Red Oil," was applied, and the fibers were then dried in hot air (e.g., at about 90° C.).

Forty-one samples, each comprising 10 single fibers, were tested for tensile properties. The results (averaged) were set forth in Table I.

Additional tests showed crimps ranging from 9.4 to 12.6 per inch, for an average of 10.95. The denier per filament of the fibers was about 1.5.

In this Example I, the starch was a common industrial grade of unmodified corn starch (e.g., Amaizo 100 pearl or Clinton 105-B Pearl corn starch), being simply the original starch granules, isolated from the corn kernel by wet milling, filtering, and drying with heated air. The source of the corn starch was regular corn (e.g., yellow dent corn; the term "corn" as used herein is synonymous with maize, e.g., zea maize). The literature indicates that the amylose constitutes a minor proportion (such as 27% of the starch) and amylopectin constitutes a major proportion (such as 73%); these proportions are on an anhydrous basis. The starch grains normally contain about 10–12% moisture, but the amounts of starch specified herein are on an anhydrous basis.

The viscose was prepared in conventional manner by treatment of pump sheets (93% alpha cellulose, dissolving pulp) with NaOH (by steeping the sheets in aqueous NaOH, then draining away NaOH solution for re-use, then pressing the mass of alkali cellulose pulp to press out "reject soda," which is a solution of hemicelluloses in aqueous NaOH), shredding the resulting alkali cellulose, xanthating the alkali cellulose and dissolving it in dilute aqueous NaOH in the mixture. The "reject" soda, after clarification (by standing to allow fibers to settle), is used to make the dilute NaOH solution which is added to the viscose mixer; thus hemicelluloses are included in the viscose.

EXAMPLE II

In this example the alkaline starch solution was injected into the viscose just before it was extruded through the spinnerette (e.g., less than ½ hour, such as 15 to 20 minutes, before such extrusion).

More specifically, a viscose solution (made from 93% alpha cellulose, dissolving pulp) [also used in Example I] and containing 9% cellulose, 6% caustic soda and 31% carbon disulfide (b.o.c.) was aged and filtered in the conventional manner at 19° C. for about 24 hours until it had a sodium chloride salt test of 6.2 to 7.2 and a ball fall viscosity of 75 to 109 seconds. It was then pumped at a controlled flow rate into a blender (high shear).

The alkaline starch solution prepared as described in Example I, was filtered, before and after deaeration, and then pumped at a controlled flow rate into the same blender, so that the thoroughly mixed solution contained 10% starch, b.o.c.

The resulting blend was pumped to the spinning machine where it was spun (to form 1.5 denier filaments in a 12,000 filament tow) by extrusion of the viscose, through circular orifices about 0.0025 inch in diameter, into a spinning bath (containing 6.0 to 10.5% sulfuric acid, 21±1% sodium sulfate and 1.5±0.2% zinc sulfate) maintained at a temperature of about 55° C., and then passed through a dilute $H_2SO_4$ stretch bath containing (as in Example I), about 3% sulfuric acid, maintained at a temperature of about 90° C. The arrangement was like that described in Example I and the degree of stretching in the stretch bath was approximately 68%. The spinning speed of the second driven roll is given in Table II. The lengths of the paths in the spinning bath and stretch baths were about ½ meter and 3.7 meters, respectively.

As in Example I, the fibers were cut and relaxed to form staple fiber (here, as in Example I, the fiber length was nominally 1 and 9/16 inches), and before drying were washed with water, desulfurizing solution, water, and treated with a finish solution. Details as to the starch level and spinning conditions, and the properties of the resulting fiber are set forth in Table II.

It is believed that no significant xanthation of the starch occurred in the short period between the injection thereof into the viscose and the spinning. It is also believed that the conditions in Example I were such that significant xanthation of the starch did not occur, even during the relatively long period when it was in admixture with the viscose. (It is noted that during aging, the vapor pressure of $CS_2$ is extremely low over the viscose, and thus it is believed that there is little $CS_2$ available for xanthation; furthermore, the presence of the starch does not appear to change the rate of aging of the viscose significantly.)

A comparison of properties of fibers obtained in the two examples indicates that the results were similar.

Example II produces a "bright" (undelustered) fiber, while the fiber of Example I is "dull" (owing to the presence of the $TiO_2$).

EXAMPLE III

In this example, cellulose of high molecular weight was employed and high stretch ratios were used to produce a higher tenacity staple fiber of relatively high wet modulus, well above 7 (Table III). Typical wet modulus values for regular rayon staple are about 3 to 4.

The pulp used to make the viscose contained 98.2% alpha cellulose, dissolving pulp. The starch solution was (after deaeration and filtration thereof) continuously injected into a stream of the aged viscose in a high shear blender, less than 5 minutes before spinning. Conventional viscose additives (of the type which delay regeneration, i.e., regeneration retarders) were included in the viscose in the viscose mixer. Examples of such additives, which may be used herein, are given in Encyclopedia of Chemical Technology, Vol. II, page 827, (Pub. 1969 by John Wiley and Sons).

The viscose was prepared as in Examples I and II, but had a lower cellulose content; its composition was 7.5% cellulose; 7.5% NaOH; 34% $CS_2$ b.o.c.; 2.1% dimethylamine b.o.c.; 3.45% Hyonic P15 (15-dendrophenol) b.o.c., and ball fall viscosity of 110 seconds. The aging gave a viscose which , just before injection of the starch, had a ball fall viscosity of 80 seconds and a salt test value of 9.9.

Starch solution was prepared, as described in Example I, to contain 13% starch and 4% NaOH, and was injected into the viscose, just before spinning, in proportion, to provide 10% starch b.o.c. Spinning of 1.5 d/f fiber was carried out using the arrangement described in Examples I and II, with a spin bath containing $H_2SO_4$ (in proportions set forth in Table III), 3.8% $ZnSO_4$, 12% $Na_2SO_4$ at 35° C. and a stretch bath containing about 4% $H_2SO_4$ at about 90° C. The spinning speed of the second driven roll was 32.5 meters/min. and the fiber path lengths in the spin bath and stretch bath were ½ and 0.7 meters, respectively. The percent stretch was well over 100%, as indicated in Table III which also gives fiber physical properties.

The fibers did not have a high enough crimp level to be considered "crimped" in the trade. However, it is within the scope of the invention to produce high-wet modulus crimped fibers by modifying the process, e.g., by decreasing acid in spin bath (e.g., to about 6%) while maintaining high salt index and degree of stretch).

EXAMPLE IV

This example illustrates the preparation of an alkaline solution of starch of decreased molecular weight for mixing with viscose in a manner such as described above. The molecular weight reduction is effected by including a small amount of 30% aqueous solution of hydrogen peroxide in the slurry of starch grains. A convenient proportion is about 0.003 to 0.015 mols of hydrogen peroxide per mol of starch. Spinning was effected under the following conditions: Viscose 9.0% cellulose; 6.0% NaOH; 31% (b.o.c.) $CS_2$; starch solution is filtered, deaerated and again filtered; and then injected into viscose less than 5 minutes before spinning; spinning 980 filaments (3 d.p.f.) into spin bath of 7.1% $H_2SO_4$, 1.1% $ZnSO_4$, 18.3% $Na_2SO_4$ at 50° C.; then stretching 60% in stretch bath containing 2.4% $H_2SO_4$ at 90° C.; path length 0.6 meter in spin bath, 0.7 meter in stretch bath; speed of second driven roll (takeup speed) is 40 meters per minute.

Table IV gives the proportions used in making up the slurry into alkaline starch solution as well as the viscosity values of the solution (after deaeration), and an indication of the filterability and the properties of the fibers made by injection of 20% starch b.o.c.

EXAMPLE V

While as indicated above, best starch solutions are obtained when the alkali concentration is above 2% NaOH and below 4½% NaOH, it is within the broader aspects of this invention to use higher concentrations of alkali, e.g., 6%. Processes using such concentrations are illustrated in this example.

A. A starch solution was prepared by mixing 635 grams of Amaizo 100 pearl starch in 3365 ml. of water and then pouring in slowly while mixing, 1680 ml. of 18% NaOH. The resulting starch solution, after filtration followed by deaeration, was injected into viscose just before spinning.

The viscose was prepared to have the following composition: 9.0% cellulose; 6.0% NaOH; 32% (b.o.c.) $CS_2$ and was aged to have a ball fall viscosity of 50 to 80, and a spinning salt test value of 6 to 7. The spinning process was as in Examples I and II; the spin bath contained 7.5% $H_2SO_4$, 3.5% $ZnSO_4$, 18% $Na_2SO_4$, and was at 50° C.

The stretch bath contained 3% $H_2SO_4$ at 90° C. The degree of stretch was 60% and the spinning speed was 40 meters per minute. The resulting staple fibers had a denier per filament of about 1½. Before drying, an adhesion-inhibiting finish (such as aqueous ½% solution of a fatty acid ester of an hexitol anhydride, e.g., Span 20, a lauric ester of sorbitan, or an oxyethylated such ester, e.g., Tween 20) was applied to the fibers to overcome their tendency to stick together.

The proportion of starch and the fiber properties are set forth in Table V.

B. Using the same procedure as in "A" above, but with 43% starch b.o.c., fibers of various deniers were prepared by appropriate changes in the rate of delivery of the solution being spun, and/or changes in the size or number of spinnerette holes. Table VI gives data obtained in these runs.

EXAMPLE VI

This example illustrated the manufacture of a disposable diaper comprising a cover sheet of a non-woven fabric made of the starch-containing fibers of this invention. A mass of the staple fibers (containing 10% starch b.o.c.) is opened by conventional means, and is then fed to a standard carding machine, or its equivalent, to produce an oriented web of fibers (a card web). A plurality of such webs (e.g., three) is brought together, one on the other, to build up a composite highly-porous web weighing about 5 to 8 grams per square meter.

A binder is then applied to this composite web to anchor the fibers together. Typically, a latex is employed, such as a latex of an elastomer, e.g., an acrylic latex. A typical binder is RHOPLEX HA-8 supplied by the Rohm and Haas Company; this is a 45% solids emulsion of a self, cross-linking acrylic copolymer based on ethyl acrylate and a minor amount of an acrylamide cross-linker, which may be cross-linked (on drying) under the action of a catalyst (such as ammonium chloride which may be incorporated in the aqueous latex before it is applied to the composite web). The latex may be applied to the web by saturation, e.g., by passing the web through a bath of the latex and squeezing out excess latex, before drying under heat, so as to apply some 10 to 50% of the solid binder (based on the weight of the fiber); preferably, the amount of binder is in the neighborhood of one fourth of the total weight of the bonded web (i.e., about one third of the weight of the fiber). The bonded web is used as the "cover stock" for making disposable diapers.

In the manufacture of the disposable diapers the following layers may be brought together:

1. cover stock next to baby's body;
2. absorbent pad, e.g., of cotton linters;
3. plastic cover (e.g., polyethylene) on outside of diaper.

If desired, a soft porous paper liner may be present on both faces of the absorbent pad, being situated between that pad and layers 1 and 3.

Another aspect of this invention relates to the inclusion, in the starch-containing rayon, of polymeric additives which markedly increase the fluid-holding capacity of the fibers. Examples of such materials are anionic polymers such as polymeric acids or salts (e.g., alkali metal salts) thereof, e.g., salts of carboxyalkyl celluloses (such as sodium carboxymethyl or carboxyethyl cellulose), salts of polyacrylic acids, (including polyacrylic acid or polymethacrylic acid homopolymer, or copolymers of acrylic and/or methacrylic acid with one or more other monomers such as acrylamide or alkyl acrylates, e.g., ethyl acrylate), salts of copolymers of maleic or itaconic acid with other monomers such as methyl vinyl ether, or naturally occurring polycarboxylic polymers, such as algin. Before their addition to the viscose these materials are preferably dissolved in aqueous medium preferably forming an alkaline solution, e.g., they may be made with an amount of alkali, such as NaOH, stoichiometrically equivalent to the amount of acidic (e.g., carboxyl) groups of the polymer or with an excess of alkali. Less desirably, these materials may be added in acid form (again preferably as aqueous solutions) and be converted to salt form by the action of the alkali present in the viscose. In a preferred form of the invention the starch is incorporated in the viscose before (or during) the aging of the viscose (e.g., in the viscose "mixer") and the solution of anionic polymer is injected into the starch-containing viscose just before spinning. It is also within the broader scope of the invention to add an alkaline solution containing both the starch and anionic polymer, preferably by injecting it into the viscose just before spinning, or to separately (consecutively with either one first, or simultaneously) inject an alkaline starch solution and an anionic polymer solution into the viscose. The anionic polymers preferably have at least 0.2 (and preferably above about 0.5) gram equivalent of salt-forming anionic groups per 100 grams of such polymer, for instance in sodium polyacrylate there is, ideally, one gram equivalent of —COONa per 94 grams (94 is the molecular weight of sodium acrylate). Examples of specific anionic polymers which may be used and descriptions of the uses of the resulting fibers are given in U.S. Pat. Nos. 3,187,747; 3,844,287; 3,847,636 and 3,919,385; the same materials may be employed in the starch-containing fibers, and the resulting fibers containing cellulose, starch and anionic polymer may be used for the same purposes as described in those patents. The fibers containing anionic polymer are preferably finished so that they are distinctly alkaline, as described for instance in U.S. Pat. No. 3,844,287.

To improve the fluid holding capacity of the starch-containing fibers polyvinvylpyrrolidone (PVP) may also be included therein instead of, or together with, the anionic polymer (e.g., in an approximate ratio of PVP: anionic polymer of 10:90, 20:80, 30:70, 50:50, 70:30 or 80:20). The PVP preferably has a high molecular weight, such as well above 10,000. Very good results have been attained with PVP of average molecular weight ranging from 100,000 to 400,000 and, more desirably, from 160,000 to 360,000, and a preferred K-value of from 50 to 100. The procedure for determining the K-value of such polymers is known in the art, as disclosed in Modern Plastics, 1945, No. 3, starting on Page 157. PVPs as described are commercially available, for example, under the designation of K-60 and K-90 from GAF Corporation. PVP is described in Encylclopedia of Polymer Science and Technology, published in 1971 by John Wiley & Sons, in the article on "N-Vinyl Amide Polymers" in Volume 14 pages 239–251. In place of all or part of the PVP one may use one or more other N-vinyl amide polymers, e.g., N-vinyl lactam polymers, N-vinyl-2-oxazolidinone polymers or N-vinyl-3-morpholinone polymers, such as the polymers (including copolymers) listed in U.S. Pat. No. 2,931,694 of Apr. 5, 1960.

The proportion of anionic polymer and/or PVP included in the starch-containing viscose should be such as to impart improved fluid holding capacity to the rayon. Preferably it is such as to produce fibers whose fluid holding capacity (as measured by the "Syngyna" method as described in Example VII below) is at least 5 cc per gram, more preferably at least 5.5 cc per gram. In general, the total proportion of added polymer is within the range of about 6 to 40% b.o.c. and more desirably in the range of about 10 or 20 to 35%, b.o.c. Higher proportions, e.g. about 50 to 70% b.o.c. may also be used. Expressed in terms of the total of cellulose, starch and added polymer (hereinafter termed "the total") the proportion of added polymer is generally in the range of about 7 to 30% such as about 10, 15 or 20%, although higher proportions may be employed.

The following Examples illustrate these aspects of the invention further.

EXAMPLE VII

In this Example, 10% starch b.o.c. was incorporated (as an aqueous solution containing 13% starch and 4% NaOH) into viscose (containing 9% cellulose, 6.0% NaOH and 31% b.o.c. $CS_2$) being mixed in the viscose mixer. After aging, there was injected, into the starch-containing viscose just before spinning through a 980 hole spinneret to form 3 d/f fibers, a solution of sodium polyacrylate made by diluting a 25% aqueous solution of a polyacrylic acid (which solution is supplied by Rohm & Haas as "Acrysol A-5") with sufficient water and an excess (e.g., 10% more than the stoichiometric amount) of NaOH to form a solution whose content of sodium polyacrylate (calculated as if all carboxyl groups are in —COONa form) is 15.7%; simple calculation shows this corresponds to a polymer content, calculated as polyacrylic acid, of 12%. The amount of injected solution was varied to give the proportions tabulated below. The spin bath composition was 7.35% $H_2SO_4$, 0.61% $ZnSO_4$, 21.8% $Na_4SO_4$ and was kept at 55° C. The aqueous stretch bath contained 2.5% sulfuric acid and was kept at 90°–95° C.; the percent stretch in that bath was about 55%. After stretching, the yarn was washed thoroughly with water and the resulting wet yarn was cut to staple fibers (1½ inches long) which were made distinctly alkaline by the following procedure: the fibers were immersed in an aqueous ½% NaOH solution at 25° C. for 15 minutes, then showered with soft water for 10 minutes, centrifuged to remove excess liquid, immersed in 0.1% aqueous solution of Span 20 at 65° C. for 5 minutes, centrifuged again and dried at 70° C.

On injection the sodium polyacrylate solution formed a dispersed phase in the starch-containing viscose, and the anionic polymer was present as a dispersed phase, visible under the microscope, in the final fibers.

The fibers from from each run were tested for fluid holding capacity as follows. The fibers were carded into webs, each having a length of about 6 inches and a weight of 2½ grams. Each of these webs was individually rolled in the direction of its width to provide a six inch roll and a string was looped about the center thereof. Each such roll was then folded on itself at the string loop and drawn into a ½ inch tube within which it was compressed by a clamp and plunger. After compression, the resulting tampons were removed, allowed to stand for a period of about 30 minutes during which the tampons recovered to a bulk density of about 0.4 g/cc. and were then evaluated for their capacity to hold water by the Syngyna Method, as described by G. W. Rapp in a June 1958 publication of the Department of Research, Loyola University, Chicago, Ill.

The following results were obtained:

| Run | % Na polyacrylate* injected b.o.c. | Fluid holding Capacity cc/g |
|---|---|---|
| A | 0 | 3.95 |
| B | 10.9 | 5.05 |
| C | 16.6 | 5.48 |
| D | 22.4 | 5.76 |

*Calculated as if all carboxyl groups are in —COONa form.

EXAMPLE VIII

In this Example a solution of starch and PVP was injected into viscose just before spinning. The injection solution was prepared by slurrying 318 g of Amaizo 100 Pearl Starch in 4380 ml water, adding 700 g of an 18% aqueous solution of NaOH while stirring and then, after five minutes adding 600 g of PVP K60 and mixing thoroughly. This solution was injected at three different rates as tabulated below. The viscose contained 9.0% cellulose, 6.0% NaOH and 32% $CS_2$. The spin bath contained 7.5% $H_2SO_4$, 1.5% $ZnSO_4$ and 20% $Na_2SO_4$ and was kept at 50° C. while the stretch bath contained 2% $H_2SO_4$ was kept at 90° C. The percent stretch in the stretch bath was 60%. After washing the fibers were tested for water retention, with the following results:

| Run | % injected, b.o.c. Starch | PVP | Water retention % |
|---|---|---|---|
| A | 0 | 0 | 122 |
| B | 5 | 5 | 144 |
| C | 10 | 10 | 169 |
| D | 15 | 15 | 204 |

While the invention has been illustrated with ordinary corn starch, it is within the broader scope of the invention to employ other starches, of at least 60% amylopectin content, alone or in various combinations with each other or with corn starch. Examples of these are rice starch, wheat starch, barley starch, tapioca (casava) and potato starch, (including starch from ordinary potatoes and sweet potatoes).

It is also within the broader scope of the invention to use grains of starches of higher (e.g., above 90%) amylopectin contents, such as those of waxy corn, waxy sorghum, and waxy (or glutinous) rice.

In using starches other than ordinary corn starch, it is desirable to check the behavior of the starch in alkaline solutions of different NaOH content (using the "microscope method" described above) in order to determine the optimum concentrations of alkali. For instance, for potato starch, the optimum concentration of the NaOH in water is, as indicated by the "microscopic method," in the range of about 4 to 8%. For some starches, the grain boundaries remain at all NaOH concentrations; for these one may determine the NaOH concentration at which maximum visible grain swelling occurs (e.g., 2 to 4% for tapioca starch and 1½ to 6% for rice starch), and employ mechanical action (e.g., high shear) to break the grain boundaries.

The salt test ("salt index") indicates the coagulability of the viscose in terms of the minimum concentration of NaCl solution (expressed as g. of NaCl per 100 ml. of solution) required to cause complete coagulation of viscose. It is determined as follows, with all solutions and equipment maintained at 18° C.: Prepare an aqueous salt solution whose concentration is near that of the expected salt index for the sample. Place 40 ml. of that solution in a 50 ml. beaker, and stir its contents by means of an electric stirring machine equipped with smooth-surfaced L-shaped monel metal stirrers, arranged so that contents of the beaker can be stirred with bottom of stirrer ⅛ inch off beaker bottom, stirrer stopped, and beaker lowered from around the stirrer; speed 350 r.p.m.

Suck some viscose up into a glass tube, 4 mm. inside diameter, 6 to 8 inches long, wipe off outside of tube, and discharge three drops of viscose into the beaker by holding the tube vertically over the beaker while stirring, and continue stirring for 1½ minutes, stop the stirrer, lower the beaker and observe the degree of coagulation of the viscose. Repeat this procedure using lesser or greater concentration of NaCl in the test until the minimum concentration of NaCl is found to the nearest 0.1 salt test unit which will cause complete coagulation of the viscose. At this point the coagulum usually hangs from the stirrer, is soft and gelatinous, and a few tiny bits of coagulum may be observed floating in the beaker. Lower concentration of NaCl produce less coagulum, and higher concentration will not appreciably increase the amount of coagulum.

The ball fall viscosity is measured by the time in seconds required for a 0.125 inch steel ball to fall a distance of 8 inches through the sample in a standard viscosity tube. Specifically the apparatus includes: (1) glass tubes, ¾ inches±1/32 inch inside diameter, 12 inches long, and closed at one end with a flat bottom; tubes have two marks completely encircling the tube, exactly 8 inches apart, and equidistant from the ends; (2) polished steel balls, 0.125 inches±0.0005 inch in diameter (grade 3 or better), free of oil or grease. The procedure is as follows: Fill the tube to within ½ inch or less of the top. When filling hold tube in a slanting position to avoid trapping of air bubbles. The samples should be fairly free of air bubbles and lumps. With tube supported in a vertical position and sample at 18° C., drop a steel ball in the center of the tube. The ball fall viscosity is the time in seconds required for the ball to fall from the top line to the bottom line; time is started and stopped as the ball appears to "cut" the lines. (If it is not possible to see the ball clearly, mount a tubular light parallel with the viscosity tube to illuminate the sample, but take care that heat from the light does not warm the sample; in running pigment-delustered viscoses, the ball may be dropped off center sufficiently to make the ball visible.) See Barr, Viscosimetry, Chapter VIII, Oxford Press, 1931. To convert to poises, the following equation may be used. The equation is based on Stokes law with modifications for end-effect and side-wall effect.

$$\text{Viscosity} = \frac{2Gr^2(d_1 - d_2)(1 - 2.104X + 2.09 \times 3 - 0.95X5)T}{9S\left(1 + 2.25\frac{2r}{H}\right)}$$

where

G = acceleration of gravity (981 cm./sec/sec.)
r = radius of steel ball (0.159 cm.)
$d_1$ = density of ball (7.78)
$d_2$ = density of viscose (or other material being tested)
S = distance of fall (20.3 cm.)
R = radius of tube (0.952 cm.)
H = total height of liquid (29.2 cm.)
X = r/R (0.167)
T = ball fall (sec.)

For the standard tube and ball the above equation simplifies to:

$$\text{Viscosity in poises} = 0.170\,(7.78 - d_2)T$$

The water retention values given herein are obtained in the following manner:

Soak 1.0 gram of staple fibers in distilled water 15 minutes at room temperature (e.g., 25° C.)
Fold fibers into a cotton cloth, which serves to keep the fibers in place during subsequent centrifuging
Soak the cloth with the fibers 15 more minutes in distilled water
Centrifuge 3½ minutes in 14" diameter basket at 1800 revolutions per minute.
Take sample out and weigh the resulting wet fibers
Dry the fibers for 4 hours at 102° C. (e.g., in a vacuum oven with dry air bleed)
Weigh dried sample
Water retention equals wet weight minus dry weight divided by dry weight expressed as a percent It was earlier postulated that when the fibers of this invention contain an anionic polymer, they are preferably distinctly alkaline. For instance, their pH (measured as a suspension of one gram of such fiber in 100 mls. of distilled water) is preferably above 8.5, or about 8.0 to 9.5.

Various changes and modifications may be made in practicing this invention without departing from the spirit and scope thereof, and therefore, the invention is not to be limited, except as defined in the appended claims.

TABLE I

| Property | Conditioned (ASTM 75° F., 57% R.H.) | Wet |
|---|---|---|
| Tenacity, g/d | 2.84 | 1.55 |
| Elongation, % | 19.15 | 23.83 |
| Breaking Energy, g.cm./cm./denier | 0.33 | 0.19 |

TABLE II

DATA ON STARCH-CONTAINING RAYON STAPLE

| RUN | Spin Speed** | Starch % boc | Ball Fall Seconds | Salt Test | Spin Bath Acid Conc. | Conditioned (at 75° F. and 59% R.H.) Tenacity g/d | % Elong. | Breaking Energy*** | Water Retention % | Crimps Per Inch (C.P.I.) |
|---|---|---|---|---|---|---|---|---|---|---|
| A | 85 | 10 | 109 | 7.2 | 10.6 | 2.74 | 20.9 | 0.34 | 147 | 7.6 |
| *B' | 40 | 20 | 100 | 7.5 | 7.6 | 2.76 | 19.9 | 0.33 | | 9.0 |
| B" | 40 | 20 | 97 | 6.2 | 7.1 | 2.88 | 18.2 | 0.31 | 126 (Avg.) | 12.5 |
| B''' | 40 | 20 | 83 | 6.7 | 6.3 | 2.78 | 18.4 | 0.31 | | 15.0 |
| C | 40 | 10 | 75 | 6.4 | 6.5 | 3.00 | 18.0 | 0.32 | 124 | 16.0 |

*Run B is subdivided according to salt test and spin bath acid values.
**Speed of second driven roll in meters per minute.
***g.cm./cm./denier
In the products of RUNS B" through C the level and type of crimp is such that the trade would consider these to be "crimped" staple fibers.

TABLE III

| Sample | % $H_2SO_4$ | % Stretch | Wet Modulus(1) | Wet Tenacity g/d. | Wet % Elong. | Wet Breaking Energy* | Conditioned Modulus(2) | Conditioned Tenacity g/d. | Conditioned % Elong. | Conditioned Breaking Energy* |
|---|---|---|---|---|---|---|---|---|---|---|
| A | 7 | 146 | 8.8 | 2.95 | 17.6 | .22 | 131 | 5.06 | 14.5 | .39 |
| B | 7 | 136 | 8.6 | 2.82 | 18.0 | .22 | 126 | 4.83 | 14.2 | .37 |
| C | 7.5 | 146 | 8.4 | 2.77 | 16.1 | .18 | 123 | 4.56 | 13.3 | .33 |
| D | 7.5 | 126 | 8.6 | 2.45 | 17.6 | .20 | 115 | 4.49 | 14.8 | .37 |
| E | 7.9 | 150 | 8.4 | 2.73 | 16.2 | .17 | 118 | 4.26 | 12.9 | .30 |
| F | 7.55 | 148 | 9.4 | 3.25 | 18.5 | .26 | 121 | 5.22 | 14.6 | .40 |
| G | 7.55 | 138 | 8.6 | 3.15 | 21.0 | .31 | 125 | 5.19 | 15.2 | .42 |
| H | 7.55 | 128 | 8.4 | 2.68 | 20.0 | .26 | 115 | 4.83 | 15.8 | .42 |
| I | 8.0 | 122 | 8.4 | 2.40 | 18.0 | .20 | 110 | 4.36 | 14.4 | .34 |
| Average | | | 8.62 | 2.80 | 18.1 | 0.224 | 120.4 | 4.76 | 14.4 | .37 |

(1)Wet modulus is the secant modulus (in g/den. per % elongation) which is the stress at 5% elongation divided by 5% (i.e., multiplied by 20).
(2)Conditioned modulus is the slope (in g/den. per % elongation) of the initial straight portion of the stress-strain curve.
*g.cm./cm./denier

TABLE IV

| | A | B | C | D | E | F | G | H |
|---|---|---|---|---|---|---|---|---|
| Slurry | | | | | | | | |
| Mls. $H_2O$ | 3737 | 3604 | 3472 | 3341 | 1870 | 1870 | 1870 | 1870 |
| Mls. 30% $H_2O_2$ | 2 | 2.5 | 3 | 3.5 | 0 | 1 | 2 | 4 |
| Grams Starch, as is | 928 | 1061 | 1193 | 1326 | 464 | 464 | 464 | 464 |
| NaOH Solution | | | | | | | | |
| Grams 18% NaOH | 1333 | 1333 | 1333 | 1333 | 666 | 666 | 666 | 666 |
| Alkaline Starch Solution | | | | | | | | |
| % Starch (anhydrous basis) | 14 | 16 | 18 | 20 | 14 | 14 | 14 | 14 |
| % NaOH | 4 | 4 | 4 | 4 | 4 | 4 | 4 | 4 |
| Properties of Starch Solution (after one day storage) | | | | | | | | |
| Ball Fall Viscosity, Seconds | 31 | 36 | 45 | 68 | 77 | 41 | 24 | 14 |
| Relative rate of buildup of pressure on filtration | 36.7 | 26.3 | 32.6 | 25.3 | — | — | — | — |
| Properties of Conditioned Fiber (20% starch b.o.c.) | | | | | | | | |
| Tenacity g/d | 2.71 | 2.75 | 2.76 | 2.65 | 2.71 | 2.79 | 2.70 | 2.62 |
| Elongation % | 20.7 | 20.8 | 19.3 | 18.3 | 18.3 | 19.4 | 19.4 | 19.6 |
| Breaking Energy, g.cm./cm./denier | .36 | .37 | .35 | .31 | .32 | .34 | .33 | .33 |

TABLE V

| Sample | % Starch b.o.c. | Denier | Tenacity g/d Conditioned | Tenacity g/d Wet | Elongation, % Conditioned | Elongation, % Wet | Breaking Energy* Conditioned | Breaking Energy* Wet | % Water Retention |
|---|---|---|---|---|---|---|---|---|---|
| A | 33 | 1.63 | 2.49 | 1.21 | 18.6 | 27.3 | 0.28 | 0.18 | 129 |
| B | 54 | 1.64 | 2.17 | .92 | 18.6 | 24.7 | 0.24 | 0.13 | 148 |

*g.cm./cm./denier

TABLE VI

| Dry Sample | 1 | 2 | 3 | 4 | 5 | 6 |
|---|---|---|---|---|---|---|
| Denier | 5 | 8 | 15 | 15 | 5 | 8 |
| % Water Retention | 127 | 128 | 126 | 132 | 141 | 140 |

What is claimed is

[1. Process for preparing starch-containing rayon fibers which comprises forming a slurry of starch granules in aqueous medium, adding sodium hydroxide (NaOH) to said slurry to produce an aqueous alkaline solution of starch, blending said solution with viscose, extruding the starch-containing viscose in fiber form and regenerating the cellulose in the extruded viscose to form starch-containing regenerated cellulose fibers, said starch having an amylopectin content of at least 60 percent.]

[2. Process as in claim 1 in which the proportion of starch is about 5 to 100% b.o.c.]

[3. Process as in claim 1 in which the proportion of starch is about 5 to 25% b.o.c.]

[4. Process as in claim 1 in which the porportion of starch is about 10 to 20% b.o.c.]

[5. Process as in claim 1 in which the NaOH concentration in said solution is between 2 and 4½%, based on the weight of water and NaOH and said granules are of corn starch.]

[6. Process as in claim 5 in which the concentration of the starch in solution is about 6 to 20%.]

[7. Process as in claim 1 in which the NaOH concentration in said solution is such that in the "microscope method" the grain boundaries disappear.]

[8. Process as in claim 7 in which the concentration of the starch in solution is about 6 to 20%.]

[9. Process as in claim 1 in which said slurry contains a starch chain-splitting agent active in alkaline medium.]

10. Process as in claim [9] *29* in which said chain-splitting agent comprises hydrogen peroxide.

11. Process as in claim 10 in which the concentration of $H_2O_2$ is at least 0.01% based on the weight of water.

12. Process as in claim [9] *29* in which the proportion of chain-splitting agent is such as to produce the alkaline starch solution having a concentration of 14 to 20% starch and a viscosity of about 35–170 poises, said viscosity being lower than that of a corresponding starch solution which has not been subjected to said chain-splitting agent.

[13. Process for preparing starch-containing rayon fibers which comprises dissolving corn starch granules in an aqueous alkaline medium which contains between 2 and 4½% NaOH based on the total weight of water and NaOH, the concentration of starch in the resulting solution being about 6 to 20%, and blending said solution with viscose and extruding the starch-containing viscose in fiber form and regenerating the cellulose in the extruded viscose to form starch-containing regenerated cellulose fibers, said starch having an amylopectin content of at least 60 percent.]

14. Process for producing rayon fibers which comprises extruding a viscose solution, containing about 5 to 25% dissolved starch b.o.c., to form a plastic stretchable fiber and then stretching said plastic fiber at least 50% to form fibers having a tenacity of at least about 2 grams per denier[, said starch having an amylopectin content of at least 60 percent].

15. Process as in claims 14 in which said viscose solution is extruded into an aqueous coagulating bath containing $H_2SO_4$ and at least 0.5% $ZnSO_4$ and is stretched at a temperature about 70° C.

16. Process as in claim 15 in which said coagulating bath containing about 6–13% $H_2SO_4$ about 0.5–5% $ZnSO_4$ and about 12–25% $Na_2SO_4$.

17. Product of the process of claim 14.

18. Process as in claim 14 in which the viscose contains a regeneration retarder, the stretching is at least 100% and the resulting fiber has a wet modulus above 7.

19. Product of the process of claim 18.

20. Process as in claim 15 in which the stretching conditions are such as to produce coagulated regenerated filaments having a skin and a partly exposed core and the stretched filaments are cut into staple fibers and then relaxed to form crimped fibers.

21. Product of the process of claim 20.

22. Process *as in claim 29* which comprises extruding in fiber form a viscose containing about 5 to 100% dissolved starch b.o.c. and an anionic polymer dispersed in said viscose and coagulating the extruded solution to form fibers containing dispersed anionic polymer and having an increased fluid holding capacity because of the presence of said anionic polymer [, said starch having an amylopectin content of at least 60 percent].

23. Process as in claim 22 in which the amount of said anionic polymer dispersed in said viscose is at least about 10% b.o.c.

24. Product of the process of claim 22.

25. Process as in claim 23 in which said anionic polymer has at least about 0.2 gram equivalent of salt forming anionic groups per 100 grams.

26. Process as in claim 25 in which said anionic polymer comprises a sodium polyacrylate.

27. Process as in claim 25 in which said anionic polymer comprises sodium carboxymethyl cellulose.

28. Process *as in claim 29* which comprises extruding in fiber form a viscose containing about 5 to 100% dissolved starch b.o.c. and polyvinylpyrollidone and coagulating the extruded solution to form fibers having increased fluid holding capacity because of the presence of said polyvinylpyrollidone [, said starch having an amylopectin content of at least 60 percent].

*29. Process for preparing starch-containing rayon fiber which comprises forming a slurry of starch granules in aqueous medium, adding an aqueous solution of a starch-splitting agent active in alkaline medium to said slurry, the proportion being about 0.003 by 0.015 moles of agent per mole of starch in slurry, adding sodium hyroxide (NaOH) to said slurry to produce an aqueous alkaline solution of starch, blending said solution with viscose, extruding the starch-containing viscose in fiber form and regenerating the cellulose in the extruded viscose to form starch-containing regenerated cellulose fibers, said starch having an amylopectin content of at least 60%.*

* * * * *